(12) United States Patent
Turner et al.

(10) Patent No.: US 7,163,079 B2
(45) Date of Patent: Jan. 16, 2007

(54) ADJUSTABLE STEERING LOCK

(75) Inventors: Marcus Turner, Coventry (GB); Ian Hulme, Leamington Spa (GB)

(73) Assignee: Ford Global Technologies, LLC, Dearborn, MI (US)

( * ) Notice: Subject to any disclaimer, the term of this patent is extended or adjusted under 35 U.S.C. 154(b) by 282 days.

(21) Appl. No.: 10/853,914

(22) Filed: May 26, 2004

(65) Prior Publication Data
US 2005/0263971 A1    Dec. 1, 2005

(51) Int. Cl.
*B60K 17/354* (2006.01)
(52) U.S. Cl. .................. 180/444; 180/446
(58) Field of Classification Search .......... 180/444, 180/443, 446, 419, 421, 422, 423
See application file for complete search history.

(56) References Cited

U.S. PATENT DOCUMENTS

| | | | |
|---|---|---|---|
| 4,970,943 A | 11/1990 | Salg et al. | |
| 6,155,377 A * | 12/2000 | Tokunaga et al. | 180/446 |
| 6,173,221 B1 * | 1/2001 | Boehringen et al. | 701/41 |
| 6,257,602 B1 * | 7/2001 | Joerg et al. | 280/93.514 |
| 6,343,671 B1 | 2/2002 | Ackermann et al. | |
| 6,520,277 B1 * | 2/2003 | Bowman et al. | 180/403 |
| 6,691,819 B1 * | 2/2004 | Menjak et al. | 180/446 |
| 6,942,058 B1 * | 9/2005 | Turner et al. | 180/446 |

FOREIGN PATENT DOCUMENTS

| | | |
|---|---|---|
| DE | 19908323 | 8/2000 |
| DE | 10200612 | 7/2003 |
| EP | 1508494 | 2/2005 |
| GB | 2308106 | 6/1997 |
| JP | 10076968 | 3/1998 |

\* cited by examiner

*Primary Examiner*—Tony Winner
(74) *Attorney, Agent, or Firm*—Frank A. MacKenzie; Price, Heneveld, Cooper, DeWitt & Litton, LLP

(57) ABSTRACT

A steering system (10) for a vehicle includes at least one wheel (14) that pivots to define a steering angle (20), and a steering lock (12) that limits an input to the steering angle (20) from an operator to a selected maximum value. The steering system (10) also includes a motor operatively connected to the wheel (14) that augments the input to the steering angle (20) from the operator, and a controller (42) operatively connected to the motor and adjusting the augmentation of the input to the steering to provide a maximum angle from the operator based upon at least one operating parameter, that includes the size of the wheel, thereby allowing the wheel (14) to pivot to a steering angle (20) based on the operating parameter that exceeds the steering angle (20) corresponding to the maximum allowable value as defined by the operator input.

19 Claims, 2 Drawing Sheets

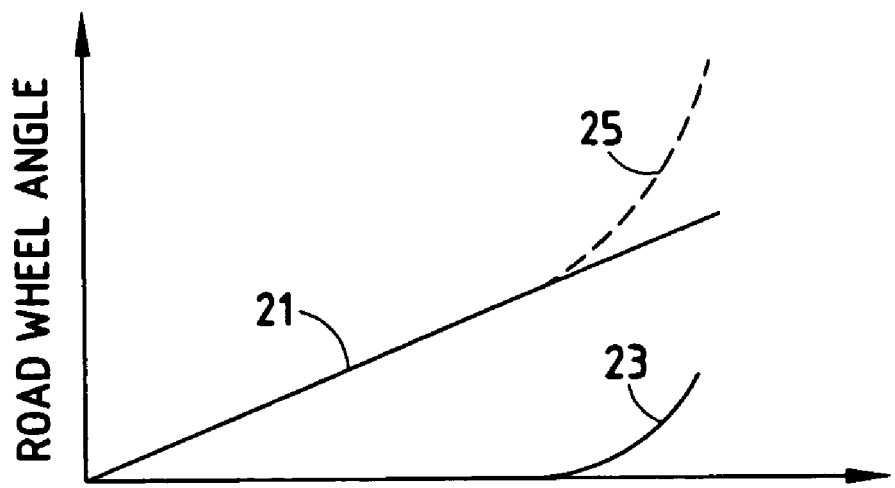
FIG. 3
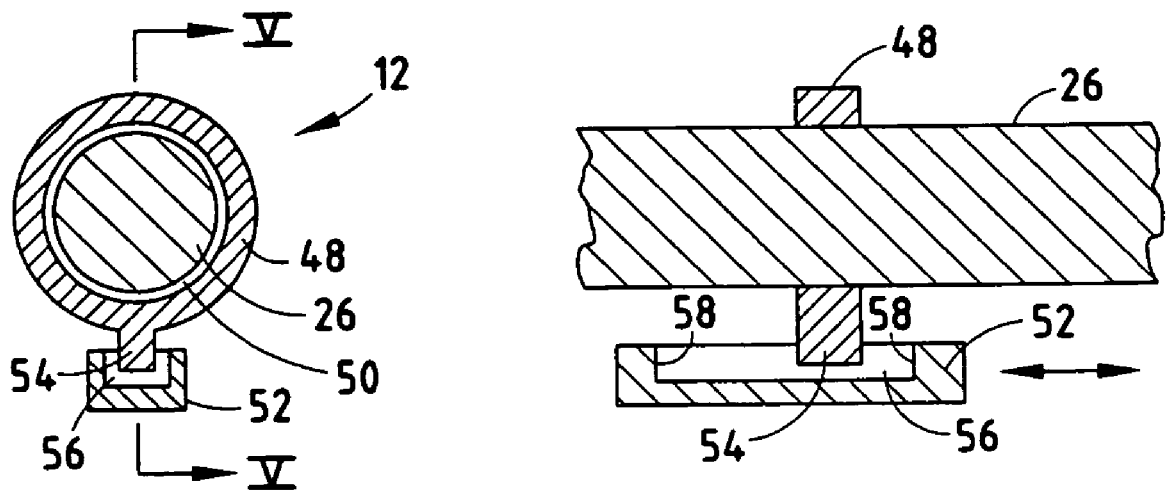
FIG. 4
FIG. 5

ADJUSTABLE STEERING LOCK

BACKGROUND OF THE INVENTION

The present invention relates to a vehicle steering system, and in particular to a steering system that can adjust the steering angle of a vehicle depending on numerous parameters.

Numerous kinds of steering locks are utilized within various vehicle steering systems to limit the maximum amount of steering angle, or the angle as formed between the front tires of a vehicle and the longitudinal axis of the vehicle. These steering lock mechanisms typically include a mechanism that restricts either the rotational movement of an associated steering column, or the linear movement of a rack within a rack and pinion linkage associated therewith, to within a predefined range.

Heretofore, steering locks have limited the maximum steering angle to within a predetermined range defined by a "worst case scenario" when considering factors such as chassis or suspension system deflection, minimum turning radius, a particular road surface, and/or a particular wheel/tire package. The predetermined ranges, therefore, unnecessarily limit the steering capabilities of the steering system in various dynamic environments.

SUMMARY OF THE INVENTION

One aspect of the present invention is to provide a steering system for a vehicle that includes at least one wheel that pivots to define a steering angle, and a steering lock that limits an input to the steering angle from an operator to a selected maximum value. The steering system also includes a motor operatively connected to the wheel that augments the input to the steering angle from the operator and a controller operatively connected to the motor and adjusting the augmentation of the input to the steering from the operator based upon at least one operating parameter that includes wheel travel, thereby allowing the wheels to pivot to a steering angle based on the at least one operating parameter and that exceeds the steering angle corresponding to the maximum value as defined by the operator input.

Another aspect of the present invention is to provide a steering system for a vehicle that includes at least one wheel that pivots to define a steering angle, and a steering wheel, an angular position of which is defined by an operator input. The steering system also includes a steering lock that limits an input to the steering angle from the operator to a selected maximum value, an actuator operatively connected to the wheel that augments the input of the operator, and a controller operatively connected to the actuator and adjusting the augmentation of the input from the operator based upon, at least in part, one operating parameter that includes wheel travel, and wherein the controller allows the steering angle to be augmented to an angle greater than that corresponding to the input to the steering angle from the operator.

Yet another aspect of the present invention is to provide a method for controlling a maximum allowable steering angle of a steerable wheel of a motor vehicle, that includes the steps of determining the maximum allowable steering angle as a function of at least one operating parameter that includes the size of the wheel, and controlling the maximum allowable steering angle of the motor vehicle during operation of the vehicle based, at least in part, upon the at least one operating parameter.

The present inventive steering system for a vehicle allows the range of the associated steering angle to be maximized for a variety of parameters during operation of the vehicle. The present inventive steering system lock increases the efficiency of the steering system, and is particularly well adapted for the proposed use.

These and other advantages of the invention will be further understood and appreciated by those skilled in the art by reference to the following written specification, claims and appended drawings.

BRIEF DESCRIPTION OF THE DRAWINGS

In the drawings:

FIG. 3 is a diagram of steering angle versus steering wheel angle for the present inventive steering system;

FIG. 4 is a cross-sectional end view of a steering column and the adjustable steering lock; and FIG. 5 is a cross-sectional side view of the steering column and the adjustable steering lock.

DETAILED DESCRIPTION OF PREFERRED EMBODIMENT

Figure 1:
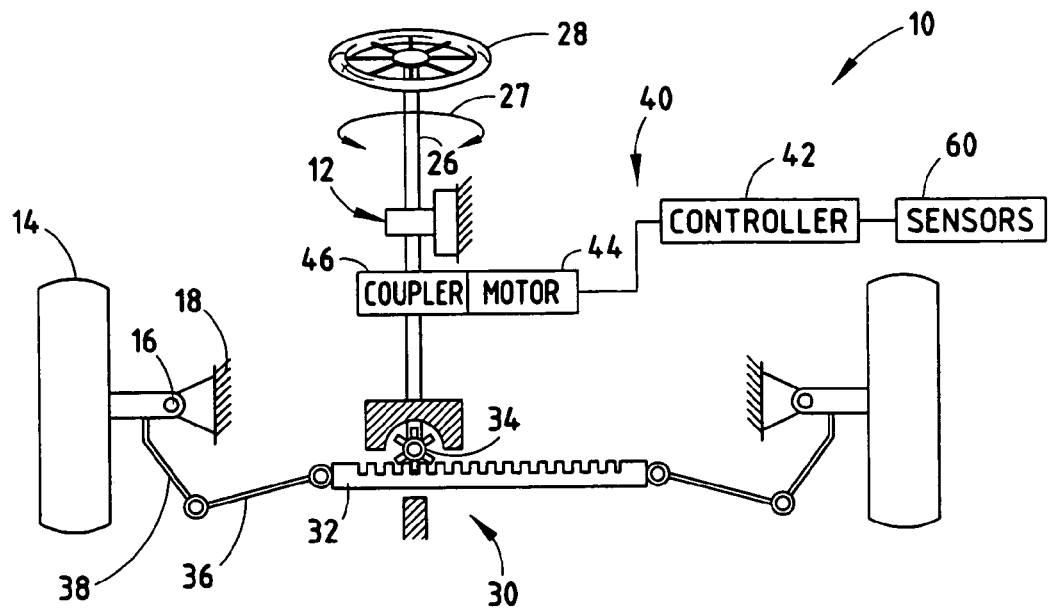
FIG. 1 is a partially schematic view of a steering system including an adjustable steering lock embodying the present invention, wherein the steering angle is 0°.
Figure 2:
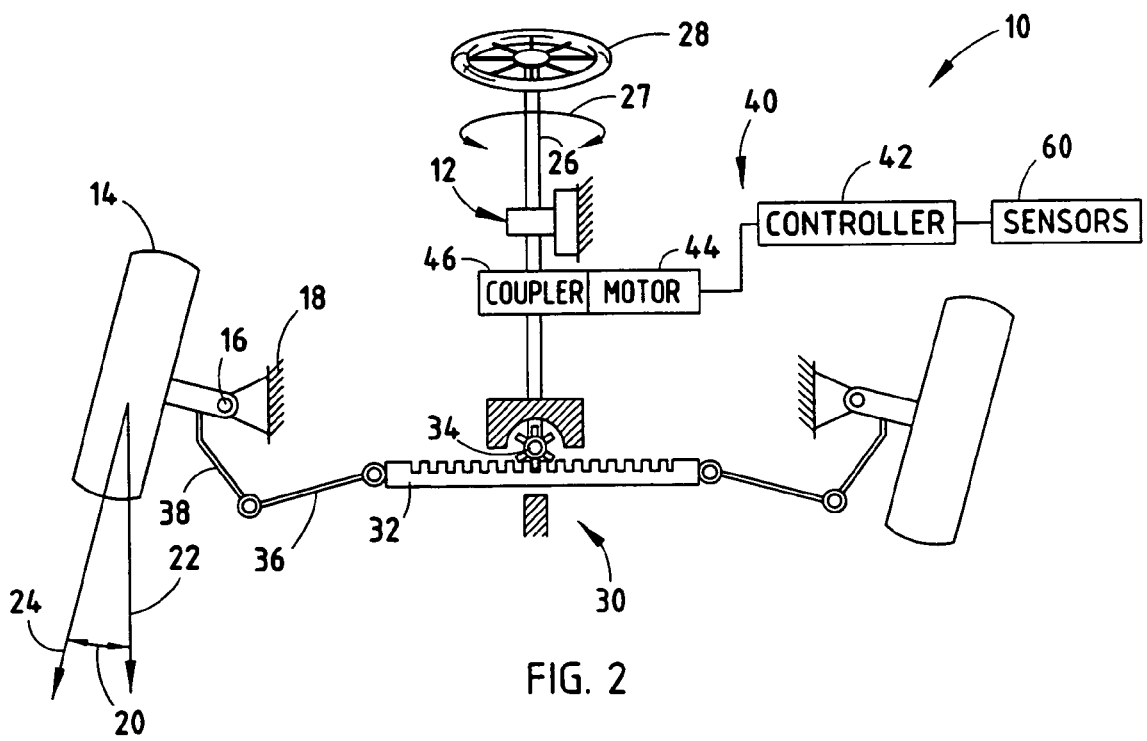
FIG. 2 is a partial schematic view of the steering system pivoted to a non-zero steering angle.

For purposes of description herein, the terms "upper," "lower," "right," "left," "rear," "front," "vertical," "horizontal," and derivatives thereof shall relate to the invention as oriented in FIGS. 1 and 2. However, it is to be understood that the invention may assume various alternative orientations and step sequences, except where expressly specified to the contrary. It is also to be understood that the specific devices and processes illustrated in the attached drawings and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 (FIG. 1) generally designates a vehicle steering system embodying the present invention. In the illustrated example, the steering system 10 includes a steering lock 12 and a pair of front wheels 14 that each pivot about an associated pivot point 16 with respect to a vehicle frame 18. Each wheel 22 defines a steering angle 20 (FIG. 2) between the longitudinal axis 22 of the associated vehicle and a central travel axis 24 of each wheel 14. It should be noted that while the steering angle 20 is defined by the pivotal movement of each of the front wheels 14, a steering angle may be defined by pivotable rear wheels if the vehicle is so equipped, and/or any other pivotable wheels.

The steering system 10 also includes a steering column 26 rotatable in a direction represented by an arrow 27, and operable to receive input from an operator via a steering wheel 28. The steering column 26 is operably linked to the front wheels 14 via a rack-and-pinion system 30 that includes a rack 32, a pinion gear 34, a pair of drag links 36, and a pair of steering arms 38. Although the present example utilizes a rack-and-pinion steering system, it should be noted that other steering systems compatible with the steering system 10 described herein may be utilized.

The steering system 10 further includes an active front steering system 40 that includes a controller 42 in operable communication with a steering assist motor 44 operably connected to the steering column 26 via a gear train 46. The active front steering system 40 assists in pivoting the wheels 14 depending on various driving parameters. Although a particular kind of active front steering system is described herein, other systems known in the art my be utilized. In basic operation, active front steering system 40 augments the input from the operator as applied to the steering wheel 28, via motor 44. As illustrated in FIG. 3, the steering angle 20 as defined by the wheel 14 follows a particular ratio along line 21. Active front steering system 40 augments the input from the operator, thereby adjusting the steering angle 20 as illustrated by line 23. Line 25 represents the effects of the combined inputs from the operator and the active front steering system 40 on the steering angle 20.

The steering lock 12 (FIG. 4) of steering system 10 includes a sliding ring 48 threadably engaging the steering column 26 via a plurality of threads 50, and a steering lock stop 52. The sliding ring 48 includes a radially outwardly extending tab 54. The lock stop 52 includes a channel 56 that includes end walls 58 and slidably receives the tab 54 therein. It should be noted that any suitable steering lock mechanism compatible with the uses described herein may be substituted for the steering lock 12.

In operation, a plurality of sensors 60 are utilized to monitor various operating parameters of the vehicle, including, but in no way limited to, the size of each wheel 14, which may include an inner wheel and an outer tire, the amount of wheel travel, the speed of the vehicle traveling along an associated roadway, and the roughness of the road surface or terrain as monitored by the degree of deflection of the vehicle suspension system or other various means. The sensors 60 are in operable communication with the controller 42 of the active front steering system 40. During operation, the operator's maximum input to the steering angle is limited by the steering lock 12, while the active front steering system 40 is utilized to assist in operating the steering system 10 by selecting a maximum value for the steering angle 20 based upon the readings from the sensors 60 as communicated to the controller 42. The active front steering system 40 is then utilized to maximize the steering angle 20 for a given set of parameters and steering wheels 14 beyond the steering angle 20 corresponding to the maximum operator input. The maximum values for the steering angle 20 as determined by the various monitored parameter may be tabulated, thereby allowing for efficiency in manually calibrating the steering system 10 as parameters change, e.g., when the size of tires on the vehicle are altered. The maximum values for the steering angle 20 may also be included within a database within the controller 42, thereby allowing the controller 42 to monitor the parameter in dynamic environments and adjust the steering system 10 accordingly.

The present inventive steering system for vehicle allows the range of the associated steering angle to be maximized for a variety of parameters during operation of the vehicle. The present inventive adjustable steering lock increases the efficiency of the steering system, and is particularly well adapted for the proposed use.

In the foregoing description it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A steering, system for a vehicle, comprising:
at least one wheel that pivots to define a steering angle and moves relative to a vehicle body to define a wheel travel;
a steering wheel operably coupled to the at least one wheel, the steering wheel rotating to define an operator input angle;
a steering lock that limits the input angle to a selected maximum value;
a motor operatively connected to the at least one wheel that augments the input angle to the steering angle from the operator; and
a controller operatively connected to the motor and adjusting the augmentation of the input to the steering angle from the operator based upon at least one operating parameter that includes an amount of wheel travel relative to the body of the vehicle that the steering system is a part of, thereby adjusting the magnitude of the steering angle when the operator input angle is at the maximum value.

2. The steering system set forth in claim 1, wherein:
the at least one operating parameter includes the size of the wheel.

3. The steering system set forth in claim 1, wherein:
the at least one operating parameter includes the speed of the vehicle.

4. The steering system set forth in claim 1, wherein:
the at least one operating parameter includes the roughness of a road surface supporting the wheel.

5. The steering system set forth in claim 1, wherein:
the at least one operating parameter includes the size of the wheel, the speed of the vehicle, and the roughness of a road surface supporting the wheel, and wherein the maximum allowable value of the steering angle is retrieved from a look up table relating wheel travel to the maximum allowable value of the steering angle.

6. A steering system for a vehicle, comprising:
at least one wheel that pivots to define a steering angle and moves relative to a vehicle body to define a wheel travel;
a steering lock that limits an input to the steering angle from an operator to a selected maximum value;
a motor operatively connected to the wheel that augments the input to the steering angle from the operator; and
a controller operatively connected to the motor and adjusting the augmentation of the input to the steering angle from the operator based upon at least one operating parameter that includes an amount of wheel travel, thereby adjusting the magnitude of the steering angle when the operator input angle is at the maximum value; and wherein:
the maximum allowable value of the steering angle is retrieved from a look up table relating wheel travel relative to the body of the vehicle that the steering system is a part of to the maximum allowable value of the steering angle.

7. A steering system for a vehicle, comprising:
at least one wheel that pivots to define a steering angle;
a steering lock that limits an input to the steering angle from an operator to a selected maximum value;
a motor operatively connected to the wheel that augments the input to the steering angle from the operator; and
a controller operatively connected to the motor and adjusting the augmentation of the input to the steering angle from the operator based upon at least one operating parameter that includes the amount of wheel travel, relative to the body of the vehicle that the steering system is a part of, the adjusting the magnitude of the steering angle when the operator input angle is at the maximum value;

a steering column providing input from an operator for controlling the steering angle, wherein the steering column includes a threaded portion, the adjustable lock includes a threaded sliding element that shifts along the steering column upon rotation of the steering column, and wherein the adjustable lock further includes a stop member that contacts the threaded sliding element to prevent further rotation of the steering column.

8. A steering system for a vehicle, comprising:

at least one wheel that pivots to define a steering angle, wherein the wheel moves relative to a vehicle body to define a wheel travel;

a steering wheel, an angular position of which is defined by an operator input;

a steering lock that limits the angular position of the steering angle to a selected maximum value;

an actuator operatively connected to the wheel that augments the input of the operator; and a controller operatively connected to the actuator and adjusting the augmentation of the input from the operator based, at least in part, upon at least one operating parameter that includes an amount of wheel travel relative to a vehicle body, and wherein the controller allows the steering angle to be augmented to an angle greater than that corresponding to the input to the steering angle of the operator, thereby adjusting the magnitude of the steering angle when the operator input angle is at the maximum value.

9. The steering system set forth in claim 8, wherein:
the at least one operating parameter includes the size of the wheel.

10. The steering system set forth in claim 8, wherein:
the at least one operating parameter includes the speed of the vehicle.

11. The steering system set forth in claim 8, wherein:
the at least one operating parameter includes the roughness of a road surface supporting the wheel.

12. The steering system as set forth in claim 8, wherein:
the at least one operating parameter includes the size of the wheel, the speed of the vehicle, and the roughness of a road surface supporting the wheel, and wherein the controller limits the steering angle to a maximum allowable value based on the operating parameter, and wherein the maximum allowable value of the steering angle is retrieved from a look up table relating wheel travel relative to a vehicle body to the maximum allowable value of the steering angle.

13. The steering system set forth in claim 8, wherein:
the controller limits the steering angle to a maximum allowable value based on the operating parameter, and wherein the maximum allowable value of the steering angle is retrieved from a look up table relating wheel travel to the maximum allowable value of the steering angle.

14. A method of controlling a maximum allowable steering angle of a steerable wheel of a motor vehicle, comprising the steps of:

determining the maximum allowable steering angle as a function of at least one operating parameter that includes a size of the wheel of the steerable wheel; and controlling the maximum allowable steering angle of the motor vehicle during operation of the vehicle based, at least in part, upon the at least one operating parameter.

15. The method set forth in claim 14, wherein:
the at least one operating parameter includes the speed of the vehicle.

16. The method set forth in claim 14, wherein:
the at least one operating parameter includes a roughness of a road surface supporting the wheel.

17. The method set forth in claim 14, wherein: the at least one operating parameter includes an amount of wheel travel.

18. The method set forth in claim 14, further including:
retrieving the maximum allowable value of the steering gear angle from a look up table relating wheel travel relative to a vehicle body to the maximum allowable value of the steering angle.

19. The method set forth in claim 14, wherein:
the at least one operating parameter includes the speed of the vehicle, the roughness of a road surface supporting the wheel and the amount of wheel travel; and further including retrieving the maximum allowable value of the steering gear angle from a look up table relating wheel travel to the maximum allowable value of the steering angle.

* * * * *